(12) United States Patent
Lee et al.

(10) Patent No.: US 10,553,850 B2
(45) Date of Patent: Feb. 4, 2020

(54) BATTERY MODULE HAVING IMPROVED OVER-CHARGE PREVENTION STRUCTURE

(71) Applicant: LG Chem, Ltd., Seoul (KR)

(72) Inventors: Jung-Hoon Lee, Daejeon (KR); Jeong-O Mun, Daejeon (KR); Eun-Gyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 31 days.

(21) Appl. No.: 15/770,693

(22) PCT Filed: Feb. 6, 2017

(86) PCT No.: PCT/KR2017/001302
§ 371 (c)(1),
(2) Date: Apr. 24, 2018

(87) PCT Pub. No.: WO2017/135796
PCT Pub. Date: Aug. 10, 2017

(65) Prior Publication Data
US 2019/0058183 A1    Feb. 21, 2019

(30) Foreign Application Priority Data

Feb. 5, 2016 (KR) .......................... 10-2016-0015155

(51) Int. Cl.
*H01M 2/34* (2006.01)
*H01M 2/20* (2006.01)
(Continued)

(52) U.S. Cl.
CPC ........... *H01M 2/345* (2013.01); *H01M 2/202* (2013.01); *H01M 2/1077* (2013.01); *H01M 2/24* (2013.01); *H01M 2200/20* (2013.01)

(58) Field of Classification Search
None
See application file for complete search history.

(56) References Cited

U.S. PATENT DOCUMENTS 3,914,723 A * 10/1975 Goodbar ............ H01H 51/2236
335/79
6,187,472 B1    2/2001 Shiota et al.
(Continued)

FOREIGN PATENT DOCUMENTS

JP    10-294097 A    11/1998
JP    H10-334882 A    12/1998
(Continued)

OTHER PUBLICATIONS

International Search Report for Application No. PCT/KR2017/001302, dated May 17, 2017 (5 Pages).

*Primary Examiner* — Scott J. Chmielecki
(74) *Attorney, Agent, or Firm* — Morgan, Lewis & Bockius LLP

(57) ABSTRACT

The present disclosure discloses a battery module including a cell assembly including cells having a lead attached thereto, a terminal busbar provided to face the lead and capable of contacting the lead, spring members pressed by a cover plate attached to the cell assembly, to apply an elastic force between the lead and the terminal busbar, and a magnet provided in at least one of the lead and the terminal busbar to provide a magnetic force capable of pushing the lead and the terminal busbar to closely contact each other.

4 Claims, 6 Drawing Sheets

(51) Int. Cl.
*H01M 2/10* (2006.01)
*H01M 2/24* (2006.01)

(56) References Cited

U.S. PATENT DOCUMENTS

| | | | |
|---|---|---|---|
| 7,511,456 B2 | 3/2009 | Lee et al. | |
| 8,541,117 B2 | 9/2013 | Van Schyndel | |
| 9,711,781 B2 | 7/2017 | Seo et al. | |
| 2010/0243396 A1* | 9/2010 | Mizuno | F16D 48/04 |
| | | | 192/48.603 |
| 2011/0223776 A1* | 9/2011 | Ferber, Jr. | H05K 3/325 |
| | | | 439/39 |
| 2011/0287287 A1* | 11/2011 | Kang | H01M 2/1077 |
| | | | 429/82 |
| 2014/0212706 A1 | 7/2014 | Ro et al. | |
| 2016/0093864 A1* | 3/2016 | Nakamura | H01M 2/206 |
| | | | 429/121 |

FOREIGN PATENT DOCUMENTS

| | | |
|---|---|---|
| JP | 2008-172879 A | 7/2008 |
| JP | 2009-117163 A | 5/2009 |
| JP | 2016-018634 A | 2/2016 |
| KR | 10-2007-0067782 A | 6/2007 |
| KR | 10-2008-0048218 A | 6/2008 |
| KR | 10-0881641 B1 | 2/2009 |
| KR | 10-2014-0097681 A | 8/2014 |
| KR | 10-1495227 B1 | 2/2015 |
| KR | 10-1500222 B1 | 3/2015 |
| WO | 2015/198008 A1 | 12/2015 |

* cited by examiner

BATTERY MODULE HAVING IMPROVED OVER-CHARGE PREVENTION STRUCTURE

TECHNICAL FIELD

The present application claims priority under 35 U.S.C. § 119 to Korean Patent Application No. 10-2016-0015155 filed on Feb. 5, 2016 in the Republic of Korea, and under 35 U.S.C. § 365 to PCT/KR2017/001302 filed on Feb. 6, 2017, the disclosures of which are incorporated herein by reference.

The present disclosure relates to a battery module, and more particularly, to a battery module including a plurality of cells and an overcharge prevention structure provided at a side of a body.

BACKGROUND

In general, a battery module includes a plurality of cells connected in series and/or in parallel. The battery module typically includes a cell assembly including a plurality of cells arranged in a direction, and a cover member having end plates capable of surrounding the cell assembly.

However, when the cells of the battery module are swollen due to overcharge, the end plates at two widthwise sides of the module bulge and expand outwards. In addition, the end plates at two lengthwise sides of the battery module are pressed due to the pressure of a large amount of gas generated from the cells during overcharge.

As an overcharge protection technology of a battery module, Korean Patent Registration No. 10-1500222 discloses a module structure in which swollen and expanded cells press a fluid pouch, the fluid in an inner space pushes a cap due to the expansion pressure of the cells to open a path and thus moves to an outer space to thrust a cutter, and a blade of the cutter breaks a welded point between a lead tab and a busbar to release electrical connection therebetween.

In addition, Korean Patent Registration No. 10-0881641 discloses a medium- or large-sized battery pack including an electrical connection member mechanically cut due to physical deformation of a battery cell when the battery cell expands by a threshold value or above, wherein the electrical connection member is a busbar, a wire, or a cable, and a part of the electrical connection member to be mechanically cut when the battery cell expands in volume is a connection part between electrode terminals and the busbar or the wire, a connection part between the cable and a tab terminal connected to the cable, or a connection part in the middle of the cable.

SUMMARY

The present disclosure is designed to solve the problems of the related art, and therefore the present disclosure is directed to providing a battery module having a structure capable of preventing overcharge by releasing electrical connection between a cell lead and a busbar through efficient, simple, and mechanical separation when cells are swollen.

In one aspect of the present disclosure, there is provided a battery module including a cell assembly including cells having a lead attached thereto, a terminal busbar provided to face the lead and capable of contacting the lead, spring members pressed by a cover plate attached to the cell assembly, to apply an elastic force between the lead and the terminal busbar, and a magnet provided in at least one of the lead and the terminal busbar to provide a magnetic force capable of pushing the lead and the terminal busbar to closely contact each other.

The magnet may be provided on an inner surface of the lead, and an iron member capable of magnetically interacting with the magnet may be provided on an outer surface of the terminal busbar to face the magnet.

The battery module may further include an insulation cover provided between the cover plate and the terminal busbar to support the spring members and the iron member.

Each of the spring members may include a first spring and a second spring placed at both sides of a supporting member capable of closely contacting the outer surface of the terminal busbar, and the first spring may be accommodated in the insulation cover and the second spring may be provided to pass through the terminal busbar.

The spring members may be symmetrically provided with respect to the iron member.

According to the present disclosure, although a control device does not operate properly, connection between a cell lead and a terminal busbar may be simply and reliably released by removing a coupling force of spring members and a magnet by using swelling of cells, and thus overcharge may be prevented.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Figure 1:
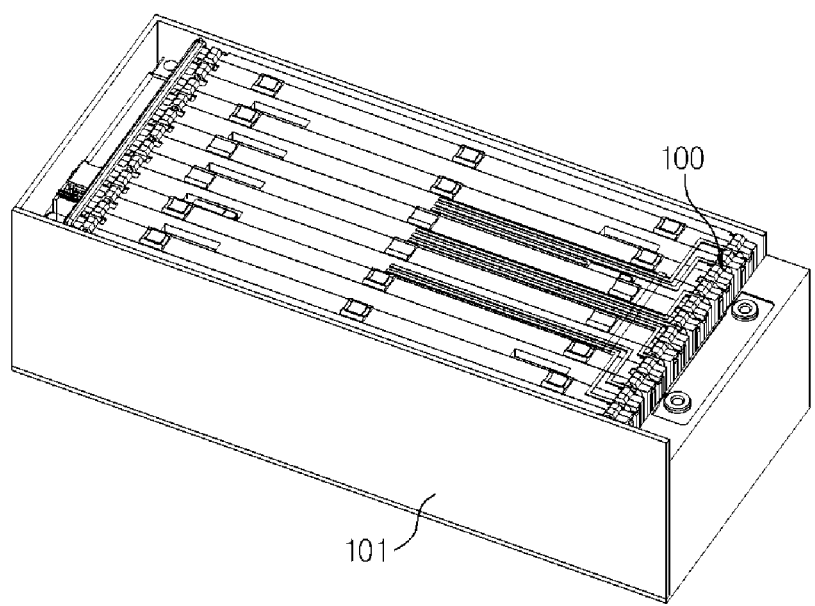
FIG. 1 is a perspective view showing the configuration of a battery module according to a preferred embodiment of the present disclosure.
Figure 2:
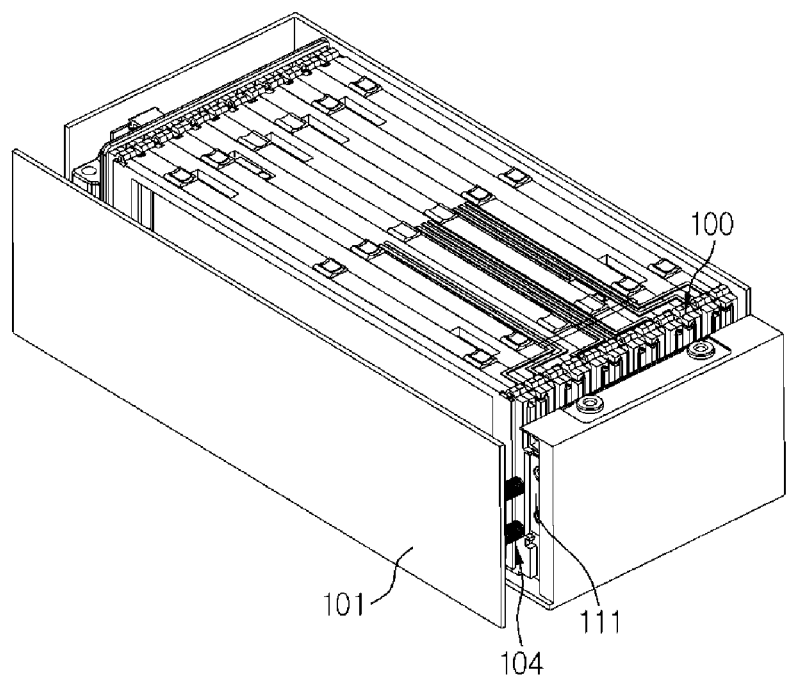
FIG. 2 is a perspective view showing that a cover plate of FIG. 1 is detached

FIG. 1 is a partially exploded perspective view showing the configuration of a battery module according to a preferred embodiment of the present disclosure, and FIG. 2 is a perspective view showing that a cover plate 101 of FIG. 1 is detached.

Referring to FIGS. 1 and 2, the battery module according to a preferred embodiment of the present disclosure includes a cell assembly 100, the cover plate 101 capable of covering an external surface of the cell assembly 100, and spring members 104 and a magnet 107 configured to provide an elastic force and a magnetic force, respectively, when the cover plate 101 is attached.

Each cell of the cell assembly 100 has a thin plate-shaped body and is preferably configured as a pouch-type secondary battery. A plurality of cells are arranged in a direction to configure a stacked structure.

Figure 3:
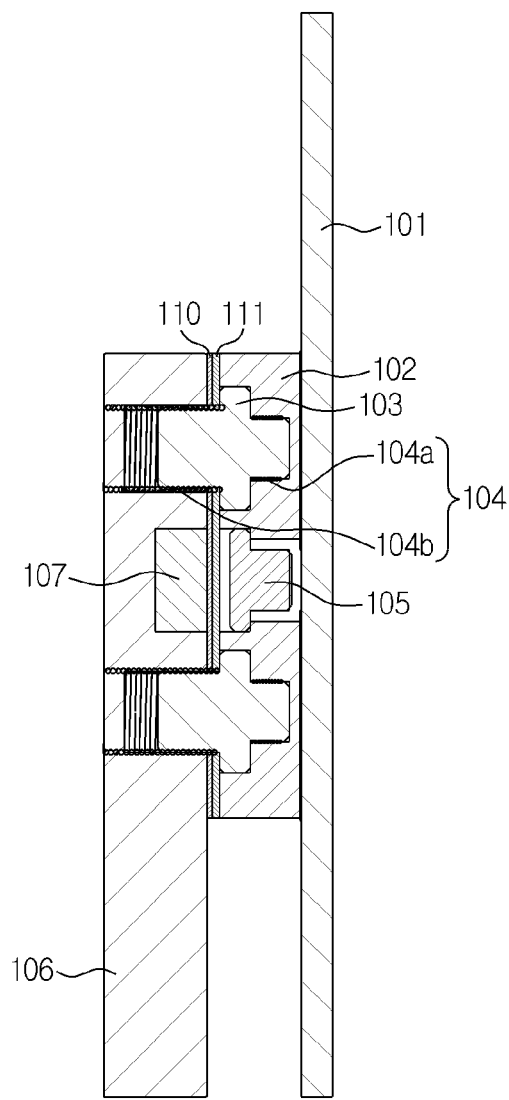
FIG. 3 is a cross-sectional view of spring members and a magnet included in the battery module according to a preferred embodiment of the present disclosure.

A terminal busbar 111 is provided on at least one end of the cell assembly 100 and is electrically connected to a lead 110 attached to the cells. As illustrated in FIG. 3, the lead 110 and the terminal busbar 111 are provided to face each other and are pushed to closely contact each other due to the elastic force of the spring members 104 and the magnetic force of the magnet 107, which are applied when the cover plate 101 is attached.

The cover plate 101 is provided to cover outermost sides of the cell assembly 100 and protects and fixes the cells. The cover plate 101 serves to provide mechanical rigidity for the cell assembly 100 and to protect the cell assembly 100 from external impact or the like. Typical coupling means such as bolts or recess/protrusion structures may be employed as means for coupling and fixing the cover plate 101 to the outermost sides of the cell assembly 100.

The spring members 104 are pressed by the cover plate 101 to apply the elastic force between the lead 110 and the terminal busbar 111 and thus strongly push the lead 110 and the terminal busbar 111 to closely contact each other. To provide the elastic force balanced by the magnetic force to be described below, the spring members 104 may be vertically symmetrically provided with respect to an iron member 105.

Figure 4:
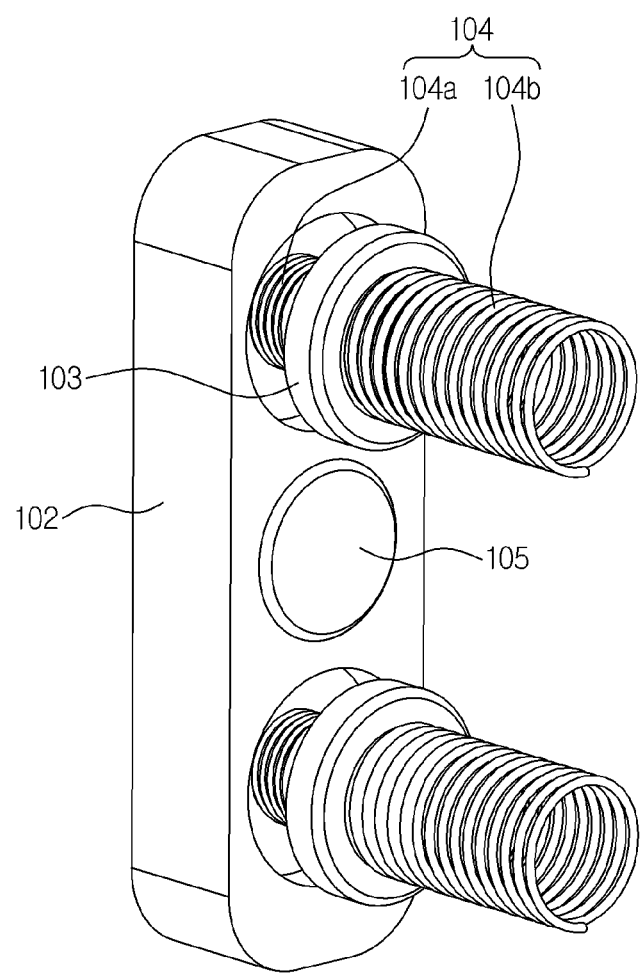
FIG. 4 is a detailed perspective view showing the configuration of the spring members of FIG. 3.

As illustrated in FIG. 4, each of the spring members 104 includes a supporting member 103 capable of closely contacting an outer surface of the terminal busbar 111, and a first spring 104a and a second spring 104b placed on two side protrusions of the supporting member 103. The first spring 104a is accommodated in an insulation cover 102 having a predetermined shape and, preferably, the second spring 104b is provided to pass through the terminal busbar 111.

The magnet 107 is provided on an inner surface of the lead 110 and provides the magnetic force to push the lead 110 and the terminal busbar 111 to more closely contact each other. Herein, the iron member 105 having a predetermined shape and capable of magnetically interacting with the magnet 107 is provided on the outer surface of the terminal busbar 111 to face the magnet 107. The iron member 105 has a block shape or a thin plate shape.

When the cover plate 101 is attached to the cell assembly 100, the magnetic force is applied between the magnet 107 and the iron member 105 towards each other and thus the lead 110 and the terminal busbar 111 are strongly pushed to closely contact each other.

Preferably, the insulation cover 102 supporting the spring members 104 and the iron member 105 is provided between the cover plate 101 and the terminal busbar 111.

Figure 5:
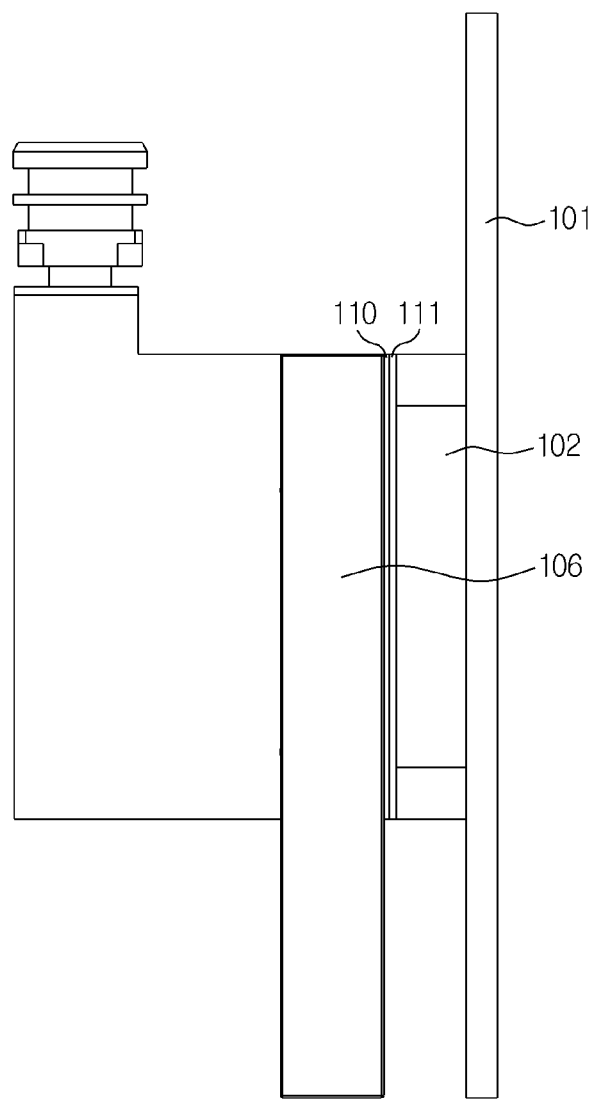
FIGS. 5 and 6 are side views showing electrical connection and separation states of the battery module according to a preferred embodiment of the present disclosure.
Figure 6:
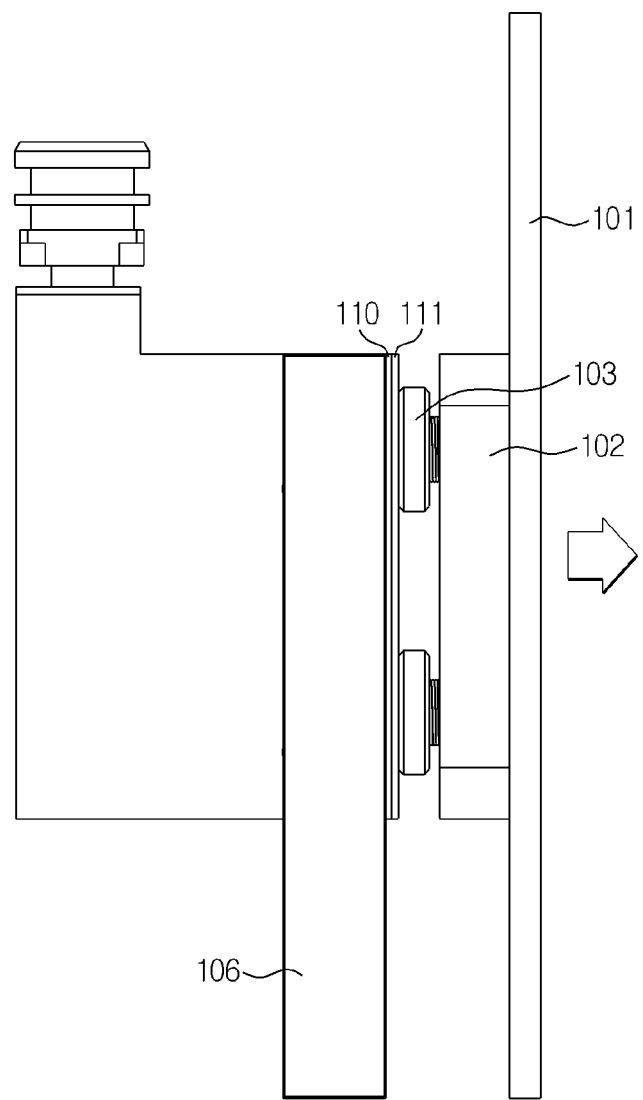

FIGS. 5 and 6 show electrical connection and separation states of the battery module according to a preferred embodiment of the present disclosure, respectively.

When the cover plate 101 is attached as illustrated in FIG. 5, as described above, since the spring members 104 are compressed to apply an elastic force to the terminal busbar 111 and, at the same time, an attractive force is applied between the magnet 107 and the iron member 105, the terminal busbar 111 and the lead 110 are pushed to closely contact each other and thus an electrical connection state is maintained therebetween.

Meanwhile, when the cell assembly 100 expands due to overcharge or the like and displacement occurs in an outward direction from the cover plate 101 as illustrated in FIG. 6, the spring members 104 are elastically restored, the terminal busbar 111 and the lead 110 are separated from each other out of the attractive force between the magnet 107 and the iron member 105, and thus the electrical connection therebetween is released. In this process, preferably, the terminal busbar 111 cooperates with the second spring 104b to be separated from the lead 110.

When the above-described battery module according to a preferred embodiment of the present disclosure is swollen due to cell overcharge or the like, although a control device for electrical cut off does not operate properly, connection between the lead 110 and the terminal busbar 111 may be reliably released by removing a coupling force of the spring members 104 and the magnet 107 by using displacement due to swelling, and thus overcharge may be prevented.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

According to the present disclosure, overcharge may be prevented by reliably releasing connection between a cell lead and a terminal busbar and thus stability of a battery module may be increased.

What is claimed is:

1. A battery module comprising:
    a cell assembly comprising cells having a lead attached thereto;
    a terminal busbar facing the lead and configured to contact the lead;
    spring members pressed by a cover plate attached to the cell assembly, to apply an elastic force between the lead and the terminal busbar; and
    a magnet in at least one of the lead and the terminal busbar to provide a magnetic force configured to push the lead and the terminal busbar to closely contact each other,
    wherein the magnet is on an inner surface of the lead, and
    wherein an iron member configured to magnetically interact with the magnet is on an outer surface of the terminal busbar to face the magnet.

2. The battery module of claim 1, further comprising an insulation cover between the cover plate and the terminal busbar to support the spring member and the iron member.

3. The battery module of claim 2, wherein each of the spring members comprises a first spring and a second spring placed at both sides of a supporting member configured to closely contact the outer surface of the terminal busbar, and wherein the first spring is accommodated in the insulation cover and the second spring is configured to pass through the terminal busbar.

4. The battery module of claim 3, wherein the spring members are symmetrically provided with respect to the iron member.

* * * * *